United States Patent
Ando et al.

(10) Patent No.: US 11,977,158 B2
(45) Date of Patent: May 7, 2024

(54) LASER RADAR DEVICE

(71) Applicant: Mitsubishi Electric Corporation, Tokyo (JP)

(72) Inventors: Toshiyuki Ando, Tokyo (JP); Jiro Suzuki, Tokyo (JP); Eisuke Haraguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 919 days.

(21) Appl. No.: 17/008,184

(22) Filed: Aug. 31, 2020

(65) Prior Publication Data

US 2020/0400822 A1    Dec. 24, 2020

Related U.S. Application Data

(63) Continuation of application No. PCT/JP2018/011771, filed on Mar. 23, 2018.

(51) Int. Cl.
| | | |
|---|---|---|
| *G01S 17/58* | (2006.01) | |
| *G01S 7/481* | (2006.01) | |
| *G01S 7/484* | (2006.01) | |
| *G01S 7/486* | (2020.01) | |

(52) U.S. Cl.
CPC ............. *G01S 17/58* (2013.01); *G01S 7/481* (2013.01); *G01S 7/484* (2013.01); *G01S 7/486* (2013.01)

(58) Field of Classification Search
CPC .................................................... G01S 17/58
See application file for complete search history.

(56) References Cited

U.S. PATENT DOCUMENTS

| | | | |
|---|---|---|---|
| 10,234,544 B2 | 3/2019 | Ando et al. | |
| 2005/0185684 A1* | 8/2005 | Stewart | H04B 10/503 |
| | | | 372/29.02 |
| 2012/0206712 A1* | 8/2012 | Chang | G01S 17/87 |
| | | | 356/28 |
| 2016/0291135 A1 | 10/2016 | Ando et al. | |
| 2017/0090031 A1* | 3/2017 | Bondy | G01S 7/4911 |
| 2017/0307648 A1* | 10/2017 | Kotake | G01S 7/484 |

(Continued)

FOREIGN PATENT DOCUMENTS

| | | | |
|---|---|---|---|
| CN | 105814452 A | | 7/2016 |
| JP | 1741370 A | | 6/2000 |
| JP | 2000174370 A | * | 6/2000 |

(Continued)

OTHER PUBLICATIONS

WO2017085799A1 (Year: 2017).*

(Continued)

*Primary Examiner* — Yuqing Xiao
*Assistant Examiner* — Zhengqing Qi
(74) *Attorney, Agent, or Firm* — Birch, Stewart, Kolasch & Birch, LLP

(57) ABSTRACT

A laser radar device performs control to make a focus distance of transmission light equal to a measurement distance by switching a plurality of laser light sources that emit beams of oscillation light having wavelengths different from each other to switch emission directions of the transmission light while maintaining the focus position of optical antennas, and changing the wavelength of the beams of oscillation light according to the measurement distance.

8 Claims, 9 Drawing Sheets

(56) References Cited

U.S. PATENT DOCUMENTS

2019/0041524 A1   2/2019  Korsgaard Jensen et al.

FOREIGN PATENT DOCUMENTS

| JP | 1313861 A | | 6/2010 |
|---|---|---|---|
| JP | 2010133861 A | * | 6/2010 |
| JP | 6005302 B2 | | 10/2016 |
| WO | WO 2016/097409 A2 | | 6/2016 |
| WO | 3081961 A1 | | 10/2016 |
| WO | WO 2018/061106 A1 | | 4/2018 |

OTHER PUBLICATIONS

Machine translation of WO2017085799A1 (Year: 2017).*
Machine translation of JP2010133861A (Year: 2010).*
Machine translation of JP2000174370A (Year: 2000).*
International Search Report for PCT/JP2018/011771, dated May 1, 2018.
Extended European Search Report, dated Feb. 1, 2021, for European Application No. 18910714.7.
Chinese Office Action for Chinese Application No. 201880091471.4, dated Dec. 8, 2023, with an English translation.

* cited by examiner

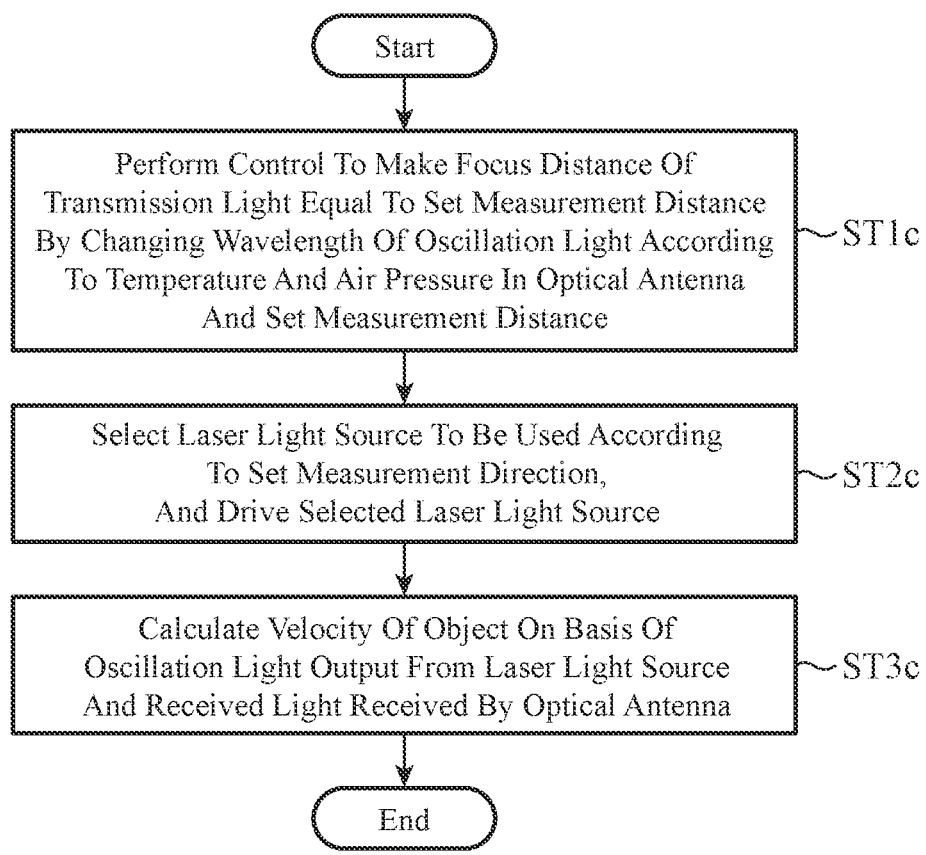

LASER RADAR DEVICE

CROSS REFERENCE TO RELATED APPLICATION

This application is a Continuation of PCT International Application No. PCT/JP2018/011771, filed on Mar. 23, 2018, which is hereby expressly incorporated by reference into the present application.

TECHNICAL FIELD

The present invention relates to a laser radar device.

BACKGROUND ART

A laser radar device emits oscillation light from an optical antenna into space, receives the oscillation light reflected or scattered by an object moving in the space with the optical antenna, and measures the moving speed of the object on the basis of a result of measurement of Doppler shift of the received oscillation light. For example, a wind-measuring lidar apparatus disclosed in Patent Literature 1 uses a laser radar device. For the purpose of dynamically changing a measurement distance, which is a distance from an optical antenna to an object, the device moves some lenses included in the optical antenna to a position according to the measurement distance so that oscillation light emitted from the optical antenna focuses at a position distanced by the measurement distance.

CITATION LIST

Patent Literatures

Patent Literature 1: JP 2010-133861 A

SUMMARY OF INVENTION

Technical Problem

To control the focus distance of oscillation light by moving some lenses included in an optical antenna along the optical axis direction, the positions of the lenses need to be adjusted with high accuracy. For example, a resolution in units of 1 μm is required as a typical resolution for positioning lenses. Thus, in the laser radar device of the related art, the optical antenna includes a driving mechanism for mechanically adjusting the positions of the lenses, which is a problem in increasing the size or the weight of the optical antenna.

One or more embodiments of this disclosure have been made to solve the aforementioned problem, and an object thereof is to provide a laser radar device capable of dynamically controlling the focus distance of transmission light without using a driving mechanism for mechanically adjusting the position of a lens included in an optical antenna.

Solution to Problem

A laser radar device according to the present invention includes a plurality of laser light sources, a modulator, a plurality of optical antennas, and processing circuitry. The laser light sources output beams of oscillation light having wavelengths different from each other. The modulator modulates frequencies and intensities of the beams of oscillation light output from the laser light sources. The optical antennas emit the beams of oscillation light modulated by the modulator as beams of transmission light that focus at a position distanced by a focus distance, and receive beams of reflected light as beams of received light, the beams of reflected light being the beams of transmission light that are reflected by an object present at a position to which the beams of transmission light are emitted. The processing circuitry calculates a velocity of the object on a basis of the beams of oscillation light output from the laser light sources and the beams of received light received by the optical antennas, and controls the laser light sources. In this configuration, a deviation of a focus point depending on a difference in wavelength of light input to each of the optical antennas is subjected to offset correction, and a beam of oscillation light emitted from a laser light source is emitted from an optical antenna associated with the laser light source among the optical antennas. The processing circuitry is configured to perform control to make the focus distance equal to a measurement distance by switching the laser light sources to switch emission directions of the beams of transmission light while maintaining the focus position of the optical antenna, and changing a wavelength of oscillation light according to the measurement distance.

Advantageous Effects of Invention

According to the present invention, the laser radar device performs control to make the focus distance equal to a measurement distance by switching the laser light sources to switch emission directions of the beams of transmission light while maintaining the focus position of the optical antenna, and changing a wavelength of oscillation light according to the measurement distance, which enables dynamic control of the focus distance of oscillation light without using a driving mechanism for mechanically adjusting the position of a lens included in an optical antenna.

BRIEF DESCRIPTION OF DRAWINGS

FIG. 11 is a flowchart illustrating operation of the laser radar device according to the second embodiment.

DESCRIPTION OF EMBODIMENTS

Embodiments for carrying out the invention will now be described referring to the accompanying drawings for more detailed explanation of the invention.

First Embodiment

Figure 1:
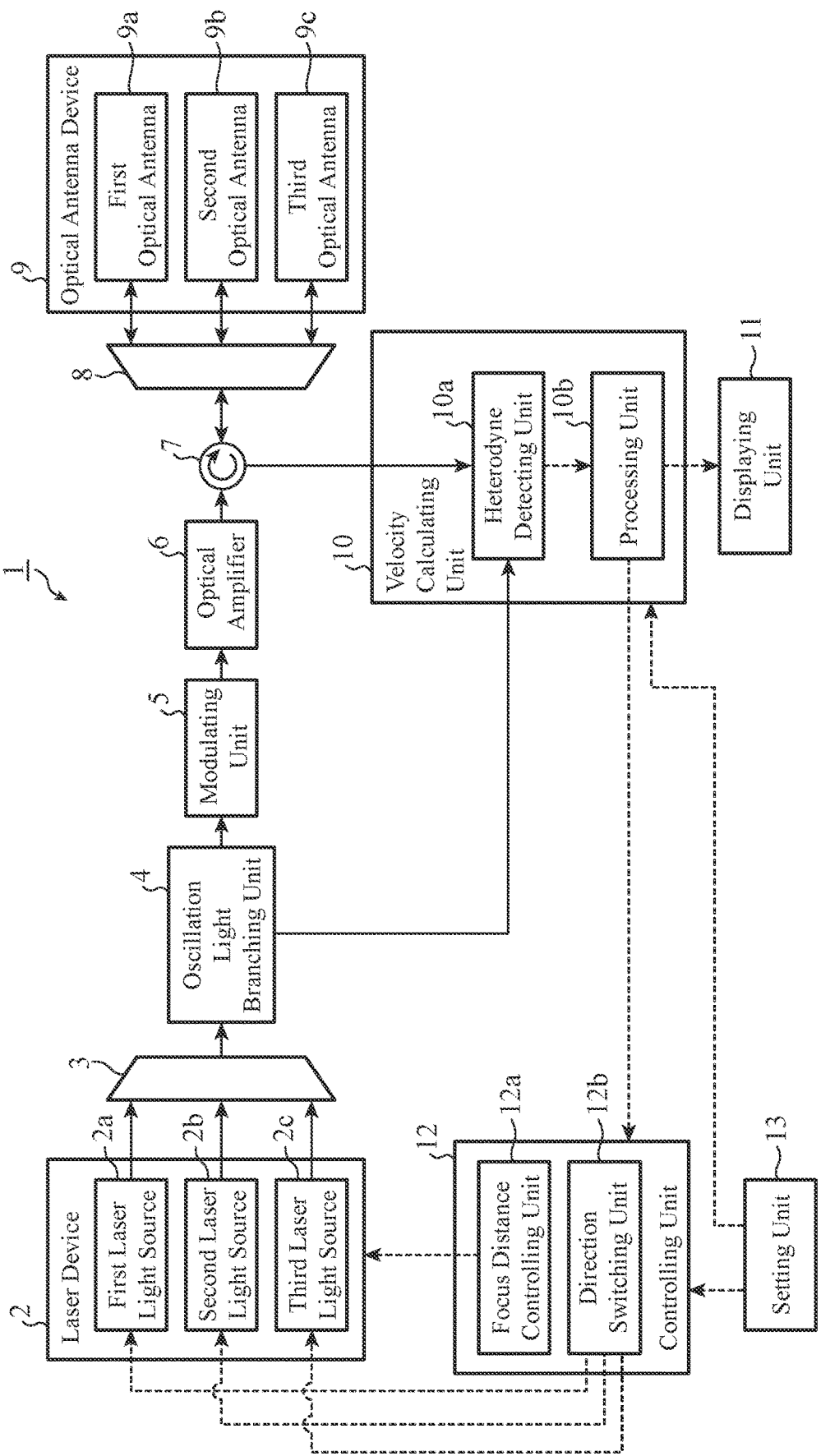
FIG. 1 is a block diagram illustrating a configuration of a laser radar device according to a first embodiment of this disclosure.

FIG. 1 is a block diagram illustrating a configuration of a laser radar device 1 according to a first embodiment of the present invention, in which the laser radar device 1 functions as a wind vane and anemometer. In FIG. 1, solid arrows represent transmission paths of optical signals, which are optical fibers, for example. Dashed arrows represent transmission paths of electrical signals. The laser radar device 1 measures the wind speed on the basis of a result of measurement of the moving speed of aerosols in the atmosphere. Aerosols are fine liquid or solid particles in the atmosphere.

The laser radar device 1 performs control to make a focus distance of oscillation light, which is output from a laser device 2, equal to a measurement distance, which corresponds to the position at which the wind speed is to be measured, by changing the wavelength of the oscillation light according to the measurement distance. The measurement distance refers to the distance from an optical antenna device 9 to the position at which measurement is to be performed. The focus distance of oscillation light refers to the distance from the optical antenna device 9 to the focus position of the oscillation light. This enables the laser radar device 1 to dynamically control the focus distance of oscillation light without using a driving mechanism for mechanically moving a lens included in the optical antenna device 9.

The laser radar device 1 includes the laser device 2, an optical multiplexing unit 3, an oscillation light branching unit 4, a modulating unit 5, an optical amplifier 6, a circulator 7, the optical antenna device 9, a velocity calculating unit 10, a displaying unit 11, a controlling unit 12, and a setting unit 13. The laser device 2 includes a first laser light source 2a, a second laser light source 2b, and a third laser light source 2c. The optical antenna device 9 includes a first optical antenna 9a, a second optical antenna 9b, and a third optical antenna 9c. The velocity calculating unit 10 includes a heterodyne detecting unit 10a and a processing unit 10b, and the controlling unit 12 includes a focus distance controlling unit 12a and a direction switching unit 12b.

The laser device 2 switches the laser light source for outputting oscillation light among the first laser light source 2a, the second laser light source 2b, and the third laser light source 2c on the basis of a control signal from the controlling unit 12, and outputs, to the optical multiplexing unit 3, oscillation light output from the laser light source resulting from the switching. The first laser light source 2a, the second laser light source 2b, and the third laser light source 2c are adjusted together to the same temperature by the focus distance controlling unit 12a, and each output oscillation light having a wavelength depending on/corresponding to the adjusted temperature. The oscillation light is of continuous oscillation and constant polarization. For example, the focus distance controlling unit 12a includes a thermoelectric cooler (hereinafter referred to as a TEC), and the TEC performs the temperature adjustment.

Hereinafter, the first laser light source 2a, the second laser light source 2b, and the third laser light source 2c are each assumed to be a laser diode (hereinafter referred to as LD) module in the description. As the LD module, an LD module for coarse wavelength division multiplexing (hereinafter referred to as CWDM) in which a plurality of distributed feedback laser diodes for wavelength division multiplexing optical communication are assembled in one package is used, for example. In each distributed feedback laser diode, the wavelength changes linearly with temperature.

Suppose that oscillation light output from the first laser light source 2a has a wavelength of 1520 nm, oscillation light output from the second laser light source 2b has a wavelength of 1540 nm, and oscillation light output from the third laser light source 2c has a wavelength of 1560 nm. A laser light source to be used is switched among the first laser light source 2a, the second laser light source 2b, and the third laser light source 2c by the direction switching unit 12b. Oscillation light output from each of the first laser light source 2a, the second laser light source 2b, and the third laser light source 2c is transmitted to the optical multiplexing unit 3 through an optical fiber.

The first laser light source 2a, the second laser light source 2b, and the third laser light source 2c may be any laser light sources that output oscillation light having wavelengths different from each other at the same temperature, and the wavelengths of the oscillation light are not limited to the aforementioned wavelength values. The first laser light source 2a, the second laser light source 2b, and the third laser light source 2c need not be an integrated LD module, but may be individually included in laser devices separate from each other. Specifically, the first laser light source 2a, the second laser light source 2b, and the third laser light source 2c may be integrated or may be separate from each other as long as the temperatures thereof are adjustable by the TEC included in the focus distance controlling unit 12a.

The optical multiplexing unit 3 receives oscillation light output from the first laser light source 2a, the second laser light source 2b, and the third laser light source 2c as input through the optical fibers, and multiplexes the input oscillation light. The oscillation light obtained by multiplexing by the optical multiplexing unit 3 is output to the oscillation light branching unit 4 via an optical fiber.

The optical multiplexing unit 3 has functions equivalent to those of a wavelength division multiplexing (hereinafter referred to as WDM) optical coupler used for an optical communication device, for example, and includes a first input port, a second input port, a third input port, and an output port. The first input port, the second input port, and the third input port transmit light of different wavelength bands from each other. The output port transmits light of all wavelengths input to the optical multiplexing unit 3.

Oscillation light from the first laser light source 2a, oscillation light from the second laser light source 2b, and oscillation light from the third laser light source 2c transmitted through the optical fibers are input to the first input port, the second input port, and the third input port, respectively. The optical multiplexing unit 3 multiplexes the three input beams of oscillation light, and outputs the resulting light through the output port.

Figure 2:
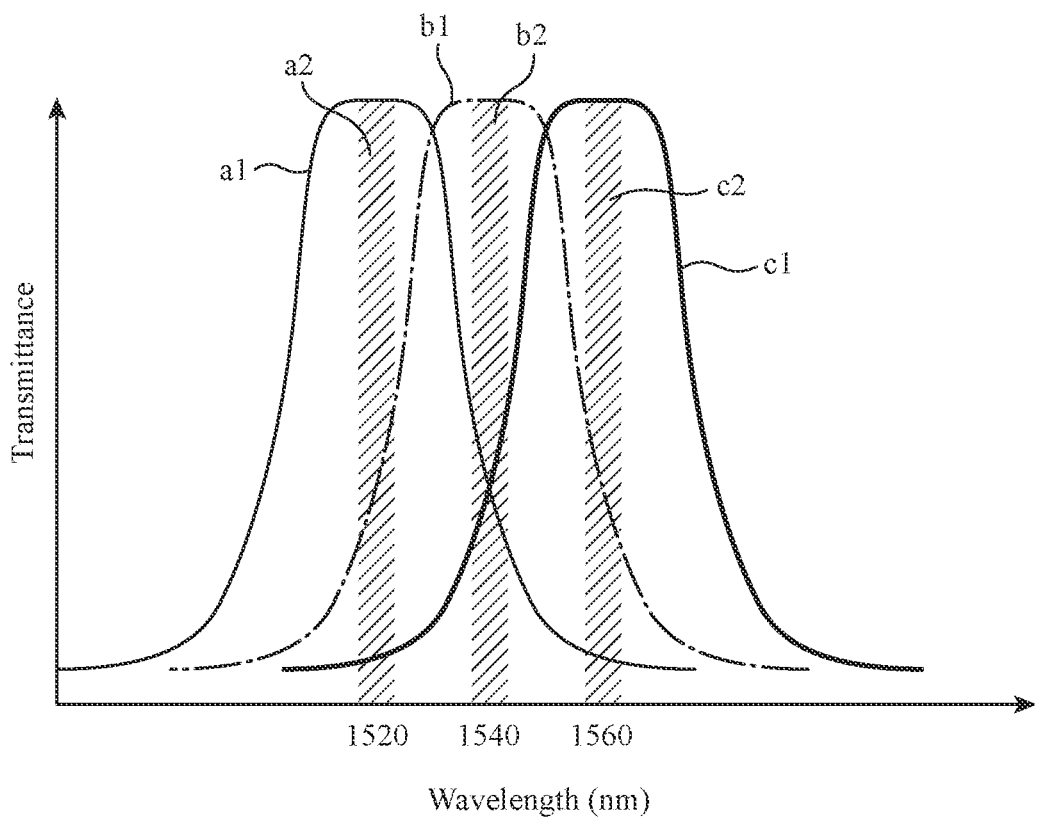
FIG. 2 is a graph illustrating transmission characteristics with respect to the wavelength of oscillation light for each of input ports of an optical multiplexing unit according to the first embodiment.

FIG. 2 is a graph illustrating transmission characteristics with respect to the wavelength of oscillation light for each of the input ports of the optical multiplexing unit 3, in which the horizontal axis represents the wavelength of oscillation light, and the vertical axis represents the transmittance of the oscillation light. Transmission characteristics a1 represent the characteristics of transmittance depending on the wavelength of oscillation light input to the first input port. Transmission characteristics b1 represent the characteristics of transmittance depending on the wavelength of oscillation light input to the second input port. Transmission characteristics c1 represent the characteristics of transmittance depending on the wavelength of oscillation light input to the third input port.

The dependencies of the transmittance of light on the wavelength at the first input port, the second input port, and the third input port are different from each other. The oscillation light with the wavelength of 1520 nm from the first laser light source 2a, the oscillation light with the wavelength of 1540 nm from the second laser light source 2b, and the oscillation light with the wavelength of 1560 nm from the third laser light source 2c are input to respective input ports that transmit light of the respective wavelengths.

In FIG. 2, a hatched region a2 represents a variable wavelength range of the oscillation light output by the first laser light source 2a, which is a region of ±3 nm of the wavelength of 1520 nm. A hatched region b2 represents a variable wavelength range of the oscillation light output by the second laser light source 2b, which is a region of ±3 nm of the wavelength of 1540 nm. A hatched region c2 represents a variable wavelength range of the oscillation light output by the third laser light source 2c, which is a region of ±3 nm of the wavelength of 1560 nm. At the first input port, the second input port, and the third input port, the transmittances of light of the respective wavelengths in the region a2, the region b2, and the region c2 are substantially constant, and the transmission characteristics are flat, as illustrated in FIG. 2. Thus, when the wavelengths of lights input to the input ports change within the region a2, the region b2, and the region c2, the intensities of light transmitted through the input ports are maintained.

Let us return to the description of FIG. 1.

The oscillation light branching unit 4 branches oscillation light output from the optical multiplexing unit 3 into transmission light and local oscillation light while maintaining the polarizations of the oscillation light output from the first laser light source 2a, the second laser light source 2b, and the third laser light source 2c. The transmission light is transmitted to the modulating unit 5 via an optical fiber, and the local oscillation light is transmitted to the heterodyne detecting unit 10a via an optical fiber. The intensity ratio of the transmission light and the local oscillation light into which the oscillation light output from the optical multiplexing unit 3 is branched does not depend on the wavelength of the oscillation light. In other words, the oscillation light branching unit 4 branches the oscillation light output from the optical multiplexing unit 3 at the same ratio for all the wavelengths.

The modulating unit 5 modulates the frequency and the intensity of the oscillation light (transmission light) output from the first laser light source 2a, the second laser light source 2b, and the third laser light source 2c and input via the optical multiplexing unit 3 and the oscillation light branching unit 4. For example, the modulating unit 5 applies an offset frequency to the transmission light input from the oscillation light branching unit 4 and performs pulse modulation in which on and off periods are repeated frequently. When the intensity is modulated by pulse modulation, the oscillation frequency is also modulated. The transmission light modulated by the modulating unit 5 is transmitted to the optical amplifier 6 via an optical fiber.

The optical amplifier 6 optically amplifies the amplitude of the transmission light input from the modulating unit 5. The transmission light optically amplified by the optical amplifier 6 is transmitted to the circulator 7 via an optical fiber.

The circulator 7 has input/output ports for three optical fibers, each being provided between the circulator 7 and the optical amplifier 6, an optical branching/multiplexing unit 8, or the heterodyne detecting unit 10a, and transmits input light in a predetermined direction. The circulator 7 outputs light input through an input/output port on the left in FIG. 1 only to an input/output port on the right in FIG. 1, and outputs light input through the input/output port on the right only to an input/output port on the lower side in FIG. 1.

For example, the circulator 7 outputs transmission light input through the input/output port connected to an optical fiber between the circulator 7 and the optical amplifier 6 only to the input/output port connected to an optical fiber between the circulator 7 and the optical branching/multiplexing unit 8. The circulator 7 outputs received light input through the input/output port connected to the optical fiber between the circulator 7 and the optical branching/multiplexing unit 8 only to the input/output port connected to an optical fiber between the circulator 7 and the heterodyne detecting unit 10a.

The optical branching/multiplexing unit 8 has functions equivalent to those of a WDM optical coupler used for an optical communication device, for example. The optical branching/multiplexing unit 8 branches and outputs transmission light transmitted from the circulator 7 toward the optical antenna device 9, and multiplexes three beams of received light input from the optical antenna device 9 and outputs the resulting light toward the circulator 7. The optical branching/multiplexing unit 8 has an input/output port connected to the optical fiber between the optical branching/multiplexing unit 8 and the circulator 7, and input/output ports connected to optical fibers between the optical branching/multiplexing unit 8 and the optical antenna device 9.

The transmission light input from the circulator 7 to the optical branching/multiplexing unit 8 is branched into different input/output ports according to the wavelengths, and output therefrom. For example, transmission light having the wavelength of the output from the first laser light source 2a is branched by the optical branching/multiplexing unit 8 into the input/output port connected to the first optical antenna 9a, and output therefrom. In a similar manner, transmission light having the wavelength of the output from the second laser light source 2b is branched by the optical branching/multiplexing unit 8 into the input/output port connected to the second optical antenna 9b, and output therefrom. Transmission light having the wavelength of the output from the third laser light source 2c is branched by the optical branching/multiplexing unit 8 into the input/output port connected to the third optical antenna 9c.

The optical branching/multiplexing unit 8 multiplexes three beams of received light input from the first optical antenna 9a, the second optical antenna 9b, and the third optical antenna 9c, and outputs the resulting light to the input/output port connected to the circulator 7.

The characteristics of the transmittance of light with respect to the wavelength for each of the input/output ports of the optical branching/multiplexing unit 8 are the same as the characteristics of the optical multiplexing unit 3 illustrated in FIG. 2. The transmission characteristics a1 illustrated in FIG. 2 are the characteristics of the transmittance depending on the wavelength of light input to the input/output port connected to the first optical antenna 9a. The transmission characteristics b1 are the characteristics of the transmittance depending on the wavelength of light input to the input/output port connected to the second optical antenna 9b. The transmission characteristics c1 are the characteristics of the transmittance depending on the wavelength of light input to the input/output port connected to the third optical antenna 9c. The input/output port connected to the circulator 7 transmits light regardless of the wavelength. In other words, the input/output port connected to the circulator 7 is capable of transmitting light of all the wavelengths input from the optical antenna device 9.

For the optical multiplexing unit 3 and the optical branching/multiplexing unit 8, WDM optical couplers that equivalently function may be used.

The optical antenna device 9 emits transmission light that is focused at a position distanced by a focus distance from an optical antenna, and receives reflected light that is the transmission light reflected by an object present at a position to which the transmission light is emitted. The optical antenna device 9 includes the first optical antenna 9a, the second optical antenna 9b, and the third optical antenna 9c, for example.

The first optical antenna 9a, the second optical antenna 9b, and the third optical antenna 9c each have a fiber collimator including a transmissive lens, and are configured to emit transmission light in directions different from each other.

Received light received by each of the first optical antenna 9a, the second optical antenna 9b, and the third optical antenna 9c is propagated through the optical fiber through which transmission light is transmitted in the direction opposite to the transmission light, and is thus transmitted to the optical branching/multiplexing unit 8.

Transmission light having the wavelength output by the first laser light source 2a is emitted from the first optical antenna 9a, transmission light having the wavelength output by the second laser light source 2b is emitted from the second optical antenna 9b, and transmission light having the wavelength output by the third laser light source 2c is emitted from the third optical antenna 9c.

The first optical antenna 9a, the second optical antenna 9b, and the third optical antenna 9c each emit transmission light in directions different from each other. Thus, the laser radar device 1 can switch the direction of transmission light emission by switching the laser light source from which transmission light is output. For example, when the laser light source from which transmission light is output is switched from the first laser light source 2a to the second laser light source 2b, the optical antenna that emits the transmission light is switched from the first optical antenna 9a to the second optical antenna 9b, and the direction of transmission light emission is thus switched. When laser light source from which transmission light is output is switched from the second laser light source 2b to the third laser light source 2c, the optical antenna that emits the transmission light is switched from the second optical antenna 9b to the third optical antenna 9c, and the direction of transmission light emission is thus switched.

Details of an optical system of the optical antennas will now be described.

Figure 3A:
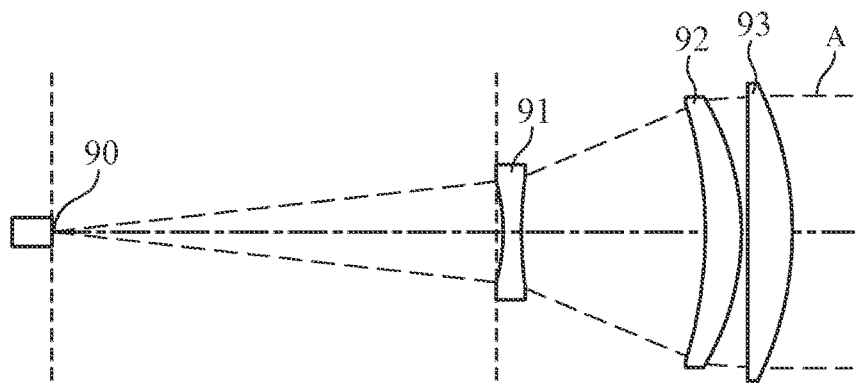
FIG. 3A is a cross-sectional view illustrating an optical system of an optical antenna to which oscillation light from a first laser light source is input.
Figure 3B:
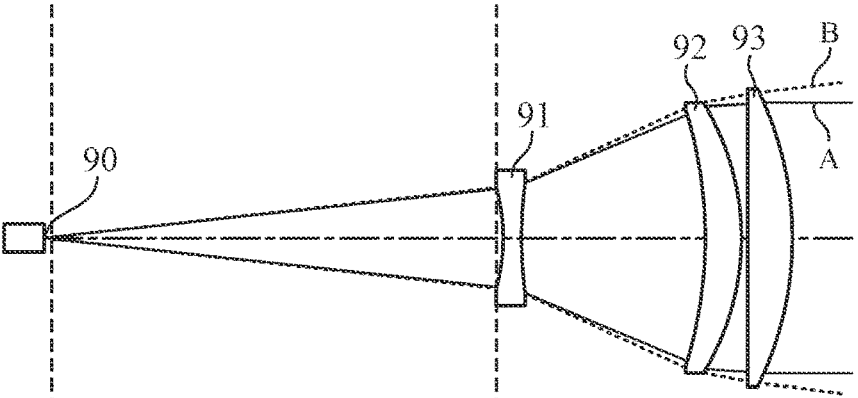
FIG. 3B is a cross-sectional view illustrating an optical system of an optical antenna to which oscillation light from a second laser light source is input.
Figure 3C:
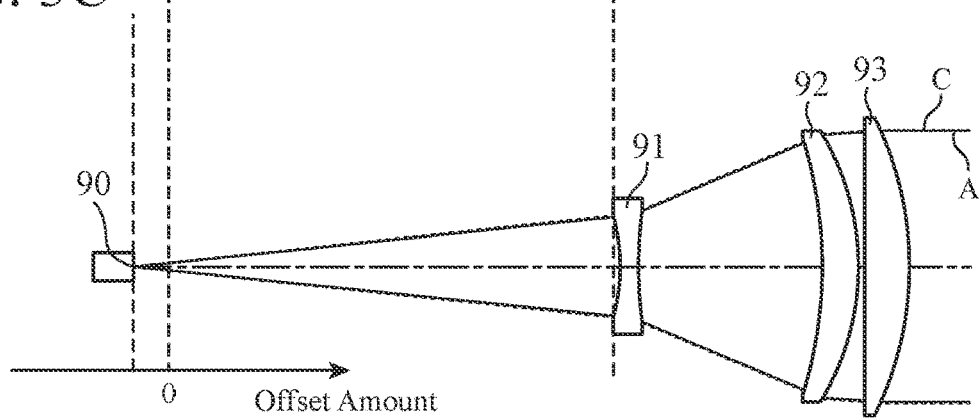
FIG. 3C is a cross-sectional view illustrating an optical system of an optical antenna to which oscillation light from a third laser light source is input.

FIG. 3A is a cross-sectional view illustrating an optical system of an optical antenna to which oscillation light from the first laser light source 2a is input, in which the position of an emitting end 90 of an optical fiber, the arrangement of optical components of the optical antenna, and a trajectory A of oscillation light beams are illustrated. FIG. 3B is a cross-sectional view illustrating an optical system of an optical antenna to which oscillation light from the second laser light source 2b is input, in which the position of an emitting end 90 of an optical fiber, the arrangement of optical components of the optical antenna, and trajectories A and B of oscillation light beams are illustrated. FIG. 3C is a cross-sectional view illustrating an optical system of an optical antenna to which oscillation light from the third laser light source 2c is input, in which the position of an emitting end 90 of an optical fiber, the arrangement of optical components of the optical antenna, and trajectories A and C of oscillation light beams are illustrated. In FIGS. 3A, 3B, and 3C, the positions of the emitting end 90 of the optical fibers are offset.

As illustrated in FIG. 3A, transmission light emitted from the emitting end 90 of the optical fiber is converted into a light beam having a constant beam diameter and a divergence angle by passing through a lens 91, a lens 92, and a lens 93, in this order while being refracted, and is then emitted into space. The lens 91, the lens 92, and the lens 93 have such characteristics that beams of transmission light having different wavelengths from each other input from the optical fiber are focused at different focus distances from each other because the refractive index of glass constituting the lenses is wavelength-dispersive. In the optical antenna illustrated in FIG. 3A, the distance between the emitting end 90 of the optical fiber and the lens 91 is adjusted so that the trajectory A of the transmission light beam corresponds to emission of parallel light. As the distance between the emitting end 90 of the optical fiber and the lens 91 is increased, transmission light is emitted in a convergent manner, and as the distance between the emitting end 90 of the optical fiber and the lens 91 is decreased, transmission light is emitted in a divergent manner.

When oscillation light output from the second laser light source 2b has a wavelength longer than that of oscillation light output from the first laser light source 2a, the trajectory of transmission light emitted from the optical antenna becomes the divergent trajectory B as illustrated in FIG. 3B. When the emitting end 90 of the optical fiber is offset from the position illustrated in FIG. 3B to the position (left position) illustrated in FIG. 3C in a state in which oscillation light output from the second laser light source 2b is input to optical antenna, the transmission light beam changes from the divergent trajectory B to the parallel light trajectory C. In this manner, an offset position of the emitting end 90 of the optical fiber at which transmission light becomes parallel light exists in the optical antenna.

Figure 4:
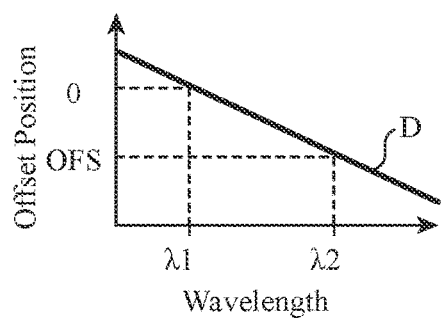
FIG. 4 is a graph illustrating the relation of the wavelength of oscillation light input to an optical antenna device and the offset position of an output end of an optical fiber.

FIG. 4 is a graph illustrating the relation of the wavelength of oscillation light input to the optical antenna device 9 and the offset position of an output end of the optical fiber. As illustrated in FIG. 4, the wavelength of oscillation light input to the optical antenna device 9 and the offset position of the optical fiber, with which the focus position with respect to the wavelength of the oscillation light is maintained at the same position, satisfy the relation of a line D. The relation of the line D can be calculated in advance from the wavelength of the oscillation light, optical components of the optical antenna device 9, and the positions thereof, for example, and the relation of the calculation result can be tabulated. When beams of light with wavelengths different from each other are input to the first optical antenna 9a, the second optical antenna 9b, and the third optical antenna 9c, the tabulated relation of the line D can be used to set an offset position with which these beams of light focus at equal distance to each other. As described above, in the first optical antenna 9a, the second optical antenna 9b, and the third optical antenna 9c, deviations of the focus points depending on the differences in the wavelengths of lights input to the respective antennas are subjected to offset correction in advance.

Figure 5:
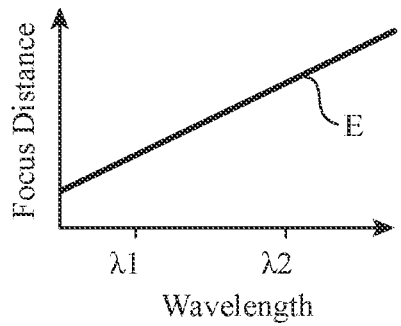
FIG. 5 is a graph illustrating the relation between the wavelength and the focus distance of oscillation light input to the optical antenna device.

FIG. 5 is a graph illustrating the relation between the wavelength of oscillation light input to the optical antenna device 9 and the focus distance. As illustrated in FIG. 5, the laser radar device 1 can be designed so that the wavelength of oscillation light input to the optical antenna device 9 and the focus distance of light having the wavelength satisfy the relation of a line E. Thus, when the wavelengths of oscillation light output from the first laser light source 2a, the second laser light source 2b, and the third laser light source 2c are changed at the same change rate, the focus distances are changed at the same rate.

For example, the TEC of the focus distance controlling unit 12a adjusts the temperatures of the first laser light source 2a, the second laser light source 2b, and the third laser light source 2c, to change the wavelengths of oscillation light output therefrom at the same change rate. As a result, the focus distances of transmission lights emitted from the first optical antenna 9a, the second optical antenna 9b, and the third optical antenna 9c are changed at the same rate.

The laser radar device 1 controls the focus distance of transmission light by using the characteristics that a change in the wavelength of transmission light input to an optical antenna changes the focus distance of the transmission light emitted from the optical antenna. This enables the laser radar device 1 to dynamically control the focus distance without using a driving mechanism for mechanically adjusting the position of a lens included in the optical antenna.

For example, suppose, in each of the optical antennas illustrated in FIGS. 3A, 3B, and 3C, that the numerical aperture (NA) of transmission light emitted from the emitting end 90 of the optical fiber is 0.1, and that the diameter of a transmission light beam emitted from the optical antenna is 60 mm. In addition, in the optical system of the optical antenna, the focus distance of transmission light is initially adjusted to 1900 m. In this case, the laser radar device 1 can change the focus distance of transmission light emitted from the optical antenna to any distance from ∞ to 970 m by changing the wavelength of oscillation light output from a laser light source within a range of ±3 nm of the reference wavelength.

In addition, the optical multiplexing unit 3 and the optical branching/multiplexing unit 8 are configured so that changes of the wavelengths of oscillation light output from the first laser light source 2a, the second laser light source 2b, and the third laser light source 2c within the range of ±3 nm do not change the light transmittances of the ports to which the beams of oscillation light are input.

Laser light sources having characteristics of the wavelength of oscillation light changing with temperature are used for the first laser light source 2a, the second laser light source 2b, and the third laser light source 2c.

The temperatures of the first laser light source 2a, the second laser light source 2b, and the third laser light source 2c are controlled so that the wavelengths of oscillation light are stable at predetermined values.

The laser radar device 1 controls the temperatures of the first laser light source 2a, the second laser light source 2b, and the third laser light source 2c to temperatures corresponding to the wavelengths of oscillation light to be output by using the TEC of the focus distance controlling unit 12a.

Let us return to the description of FIG. 1.

The velocity calculating unit 10 calculates the speed of an object on the basis of oscillation light (transmission light) output from the laser device 2 and received light received by the optical antenna device 9. For example, when the laser radar device 1 functions as a wind vane and anemometer, the object whose speed is to be calculated is aerosols. The velocity calculating unit 10 calculates the speed of aerosols to which transmission light is emitted by using local oscillation light input from the oscillation light branching unit 4 and received light input from the circulator 7, and determines a wind direction and wind speed distribution at the position to which the transmission light is emitted on the basis of the calculation result.

The heterodyne detecting unit 10a includes a photoelectric conversion unit, which is not illustrated, and local oscillation light and received light are multiplexed and input to the photoelectric conversion unit. A photodiode is used for the photoelectric conversion unit, for example. The heterodyne detecting unit 10a uses the electrical signal converted by the photoelectric conversion unit of the multiplexed signal of the local oscillation light and the received light to generate a beat signal, being a conversion of a light intensity into an electrical signal, that vibrates at a difference frequency between the local oscillation light and the received light, and outputs the generated beat signal to the processing unit 10b.

The processing unit 10b converts the beat signal input from the heterodyne detecting unit 10a from analog to digital at a preset sampling rate, and generates a plurality of beat signal strings by dividing the beat signal converted into a digital signal into strings having a length corresponding to the pulse width of the transmission light. The beat signal strings are stored in a storage area of a memory, which is not illustrated, by the processing unit 10b.

The process of dividing the beat signal by the pulse width of the transmission light will be referred to as a "reception gate process".

The processing unit 10b further determines the processing content in the reception gate process, including the length by which the beat signal is divided, on the basis of information indicating the measurement distance set by the setting unit 13.

The processing unit 10b performs fast Fourier transform on the beat signal strings obtained by performing the reception gate process on the beat signal to obtain a peak value, a spectral value, and an S/N ratio of a power spectrum for each of the beat signal strings. Note that each of the beat signal strings corresponds to returned light (received light) affected by the speed of the object measured at measurement distances different from each other from a shortest distance to a longest distance in chronological order. The frequency of the returned light undergoes Doppler frequency shift in proportion to the speed of the object. For example, the processing unit 10b calculates Doppler frequency proportional to the wind speed measured at any measurement distance by using the beat signal strings, and calculates the wind speed by using the calculated Doppler frequency.

The processing unit 10b stores the measurement distance associated with the direction of transmission light emission and set by the setting unit 13 and the calculated value of the calculated wind speed in the memory. Because the first optical antenna 9a, the second optical antenna 9b, and the third optical antenna 9c are oriented in directions different from each other, the processing unit 10b can calculate the wind speed in three directions. The processing unit 10b analyzes the wind direction and wind speed distribution in the distance direction by performing a vector operation using the information stored in the memory. The result of analysis of the wind direction and wind speed distribution made by the processing unit 10b is transmitted to the displaying unit 11.

Alternatively, the processing unit 10b may set the measurement distance and the measurement direction at the controlling unit 12.

The displaying unit 11 is implemented by a display device such as a liquid crystal monitor, and displays a processing result input from the velocity calculating unit 10. For example, the processing result is the result of analysis of the wind direction and wind speed distribution made by the velocity calculating unit 10.

The controlling unit 12 controls the focus distance of transmission light emitted from the optical antenna device 9 and controls the emission direction of the transmission light emitted from the optical antenna device 9 by changing the wavelength of oscillation light output by the laser device 2 depending on the measurement distance.

The focus distance controlling unit 12a controls the focus distances of transmission light emitted from the optical antenna device 9 by changing the wavelength of oscillation light output by the first laser light source 2a, the second laser light source 2b, and the third laser light source 2c on the basis of the measurement distances set by the setting unit 13.

The focus distance controlling unit 12a includes the TEC for controlling the temperatures of the first laser light source 2a, the second laser light source 2b, and the third laser light source 2c, and is capable of changing the temperatures to any values by using the TEC. For example, the focus distance controlling unit 12a has set therein tabulated data of the relation of the focus distance of transmission light and the wavelength of the transmission light and the relation of the wavelength of the transmission light and the temperature of the laser light source. When the measurement distance is set by the setting unit 13, the focus distance controlling unit 12a refers to the tabulated data, and identifies the temperature of a laser light source associated with the wavelength of the transmission light whose focus distance is the measurement distance set by the setting unit 13. The focus distance controlling unit 12a then performs temperature control on the laser light source with a target at the identified temperature by using the TEC.

The direction switching unit 12b switches the orientation of transmission light emitted from the optical antenna device 9 in response to a switching request set by the setting unit 13. For example, the direction switching unit 12b selects and drives a laser light source to emit transmission light from among the first laser light source 2a, the second laser light source 2b, and the third laser light source 2c so that the measurement direction specified by the switching request is the orientation of the transmission light.

Note that the first optical antenna 9a, the second optical antenna 9b, and the third optical antenna 9c are supported and fixed so that the beams of transmission light emitted therefrom are oriented in directions different from each other.

Transmission light output from the first laser light source 2a is emitted from an optical antenna associated therewith in advance among the first optical antenna 9a, the second optical antenna 9b, and the third optical antenna 9c. Transmission light output from the second laser light source 2b is emitted from an optical antenna other than the optical antennas associated with the first laser light source 2a and the third laser light source 2c among the first optical antenna 9a, the second optical antenna 9b, and the third optical antenna 9c. In a similar manner, transmission light output from the third laser light source 2c is emitted from an optical antenna other than the optical antennas associated with the first laser light source 2a and the second laser light source 2b among the first optical antenna 9a, the second optical antenna 9b, and the third optical antenna 9c.

Thus, when the direction switching unit 12b switches the laser light source to emit transmission light among the first laser light source 2a, the second laser light source 2b, and the third laser light source 2c, the orientation of transmission light emitted from the optical antenna device 9 is switched.

The setting unit 13 receives inputs of a measurement distance and a measurement direction, sets the received measurement distance in the focus distance controlling unit 12a, and sets the measurement direction in the direction switching unit 12b. For example, a user of a wind vane and anemometer inputs the position and the direction at and in which the wind speed is to be measured by using an input device, which is not illustrated. The setting unit 13 identifies a measurement distance that is the distance between the position input with the input device and the position of the optical antenna device 9, and sets information indicating the identified measurement distance in the controlling unit 12. The setting unit 13 further identifies a measurement direction that is the direction input with the input device, and sets information indicating the identified measurement direction in the controlling unit 12. Alternatively, the setting unit 13 may periodically receive a position and a direction from a device external to the laser radar device 1, and set information indicating a measurement distance and a measurement direction identified on the basis of the received position and direction in the controlling unit 12.

The information indicating the measurement distance is also set in the processing unit 10b by the setting unit 13.

Next, operations will be explained.

Figure 6:
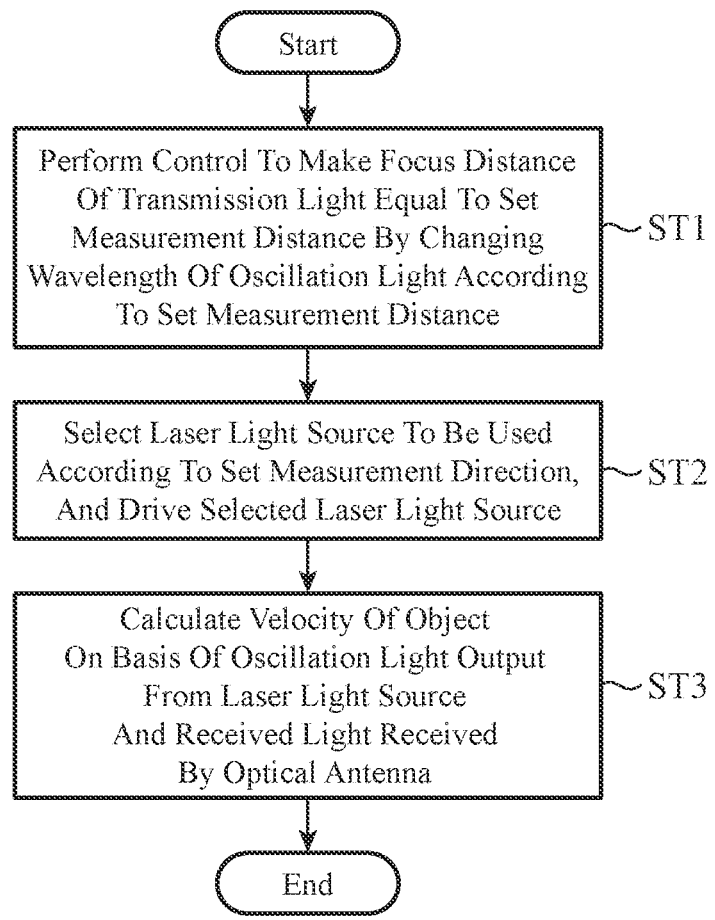
FIG. 6 is a flowchart illustrating operation of the laser radar device according to the first embodiment.

FIG. 6 is a flowchart illustrating operations of the laser radar device 1.

The setting unit 13 sets a measurement distance received from a user in the focus distance controlling unit 12a, and sets a measurement direction in the direction switching unit 12b. The setting unit 13 further sets the measurement distance in the processing unit 10b. The processing unit 10b determines the processing content in the reception gate process, including the length by which the beat signal is divided, on the basis of information indicating the measurement distance set by the setting unit 13.

The focus distance controlling unit 12a performs control to make the focus distance of transmission light equal to the measurement distance by changing the wavelength of oscillation light output from the laser device 2 according to the measurement distance set by the setting unit 13 (step ST1). For example, the focus distance controlling unit 12a refers to tabulated data of the relation of the focus distance of transmission light and the wavelength of the transmission light and the relation of the wavelength of the transmission light and the temperature of the laser light source to identify the temperature of a laser light source associated with the wavelength of the transmission light whose focus distance is the measurement distance. The focus distance controlling unit 12a then performs temperature control on the laser light source with a target at the identified temperature by using the TEC. As a result, the wavelength of oscillation light output from the laser device 2 changes according to the measurement distance.

The direction switching unit 12b selects a laser light source to be used from among the first laser light source 2a, the second laser light source 2b, and the third laser light source 2c according to the measurement direction set by the setting unit 13, and drives the selected laser light source (step ST2). For example, the direction switching unit 12b selects and drives a laser light source to emit transmission light from among the first laser light source 2a, the second laser light source 2b, and the third laser light source 2c so that the measurement direction specified by a switching request input from the setting unit 13 is the orientation of the transmission light.

The laser light source driven by the controlling unit 12 outputs oscillation light of continuous oscillation and constant polarization. The oscillation light output from the laser light source is transmitted to the oscillation light branching unit 4 through the optical multiplexing unit 3. The oscillation light branching unit 4 branches the oscillation light transmitted from the optical multiplexing unit 3 into transmission light and local oscillation light while maintaining the polarization state. The transmission light is transmitted to the modulating unit 5, and the local oscillation light is transmitted to the velocity calculating unit 10.

The modulating unit 5 modulates the frequency and the intensity of the transmission light transmitted from the oscillation light branching unit 4. The transmission light modulated by the modulating unit 5 is optically amplified by the optical amplifier 6, and transmitted to the optical branching/multiplexing unit 8 by the circulator 7. The optical branching/multiplexing unit 8 transmits the transmission light transmitted from the circulator 7 to the optical antenna device 9. The optical antenna device 9 emits the transmission light from an optical antenna. Because control is performed by the focus distance controlling unit 12a to make the focus distance of the transmission light equal to the measurement distance, the transmission light focuses at the measurement distance.

The transmission light emitted from the optical antenna device 9 is backscattered by an object in an observed space, and undergoes Doppler frequency shift according to the moving speed of the object. The optical antenna device 9 receives the backscattered light, that is, received light that is the transmission light reflected by the object. Because the transmission light is controlled to focus at the measurement distance, the intensity of the transmission light is highest at the position at the measurement distance from the optical antenna device 9. As a result, even when portion of transmission light is reflected by objects at various positions and then received as received light, the proportion of received light having been reflected at the position at the measurement distance is the highest. Thus, the S/N ratio of received light having been reflected at a position distanced by the measurement distance is higher.

The received light received by the optical antenna device 9 is transmitted to the optical branching/multiplexing unit 8, and the optical branching/multiplexing unit 8 transmits the received light to the circulator 7. The circulator 7 transmits the received light to the velocity calculating unit 10. The velocity calculating unit 10 calculates the speed of the object on the basis of the oscillation light output from the laser light source selected in step ST2 and the received light received by the optical antenna device 9 (step ST3).

The heterodyne detecting unit 10a performs heterodyne detection by using the local oscillation light input from the oscillation light branching unit 4 and the received light input from the circulator 7. For example, the heterodyne detecting unit 10a optically multiplexes the local oscillation light and the received light and performs photoelectric conversion on the resulting light to generate a beat signal with a difference frequency between the local oscillation light and the received light. The processing unit 10b performs frequency analysis of the beat signal generated by the heterodyne detecting unit 10a, and calculates the wind speed in the direction of transmission light emission at the measurement position. Information indicating the wind speed calculated by the processing unit 10b is stored in the memory included in the laser radar device 1.

The wind speed measurement using the laser radar device 1 can be more widely and more conveniently used by enabling measurement of three-dimensional wind speed in addition to measurement of wind speed in one direction. The three-dimensional wind speed can be obtained by a three-point positioning method. For example, the direction switching unit 12b sequentially switches the optical antenna that emits the transmission light by switching the laser light source to be used, and the velocity calculating unit 10 calculates the wind speeds in three different directions around a measurement position. The velocity calculating unit 10 can estimate a three-dimensional wind speed distribution of the wind speed by a vector operation using the wind speeds in the three directions, and can further calculate a wind speed distribution at each measurement distance.

Next, control of the focus distance of transmission light will be explained in detail.

Figure 7:
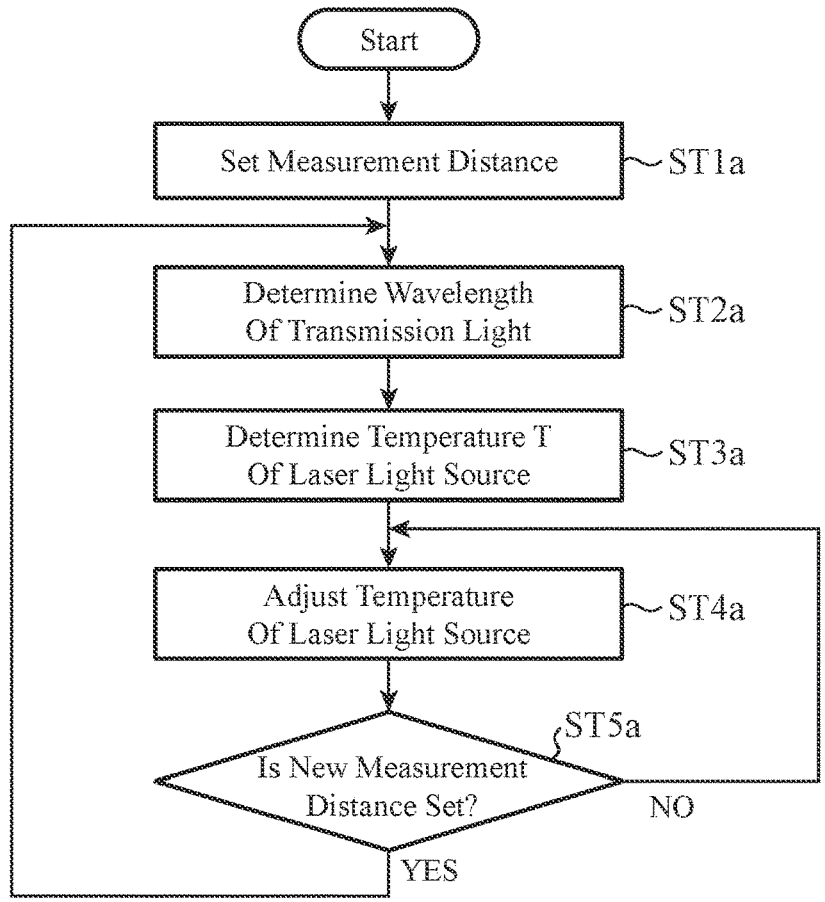
FIG. 7 is a flowchart illustrating operation of a focus distance controlling unit according to the first embodiment.

FIG. 7 is a flowchart illustrating operations of the focus distance controlling unit 12a, and illustrates detailed processing of step ST1 in FIG. 6.

When the measurement distance is set by the setting unit 13 (step ST1a), the focus distance controlling unit 12a determines a wavelength of transmission light with which the focus distance of the transmission light emitted by the optical antenna and the measurement distance set by the setting unit 13 are equal to each other (step ST2a).

For example, the focus distance controlling unit 12a refers to tabulated data of the relation of the focus distance of transmission light and the wavelength of the transmission light and the relation of the wavelength of the transmission light and the temperature of the laser light source to determine the wavelength of the transmission light whose focus distance is the measurement distance.

Subsequently, the focus distance controlling unit 12a determines a temperature T at which the laser light source outputs transmission light with the determined wavelength (step ST3a). For example, the focus distance controlling unit 12a refers to the table data to determine the temperature T at which the laser light source outputs light with the wavelength determined in step ST2a.

The focus distance controlling unit 12a performs temperature adjustment by using the TEC so that the temperature of each of the first laser light source 2a, the second laser light source 2b, and the third laser light source 2c becomes the temperature T determined in step ST3a (step ST4a). The laser light source associated with the optical antenna that emits the transmission light outputs oscillation light with the wavelength determined in step ST2a among the first laser light source 2a, the second laser light source 2b, and the third laser light source 2c subjected to temperature adjustment to the temperature T. In this manner, control is made to make the focus distance of transmission light emitted from the optical antenna and the measurement distance set by the setting unit 13 equal to each other.

Thereafter, the focus distance controlling unit 12a determines whether or not a new measurement distance is set by the setting unit 13 (step ST5a). If no new measurement distance is set (step ST5a; NO), the focus distance controlling unit 12a returns to the process in step ST4a, and maintains the individual temperatures of the first laser light source 2a, the second laser light source 2b, and the third laser light source 2c together at the temperature T.

If a new measurement distance is set by the setting unit 13 (step ST5a; YES), the focus distance controlling unit 12a returns to the process in step ST2a, and repeats the series of processes described above so that the newly set measurement distance and the focus distance of the transmission light become equal to each other.

The individual temperatures of the first laser light source 2a, the second laser light source 2b, and the third laser light source 2c are controlled together as described above, and the wavelength of transmission light is caused to be a wavelength with which the focus distance of the transmission light and the measurement distance are equal to each other.

Next, the process of switching the direction of transmission light emission will be explained in detail.

Figure 8:
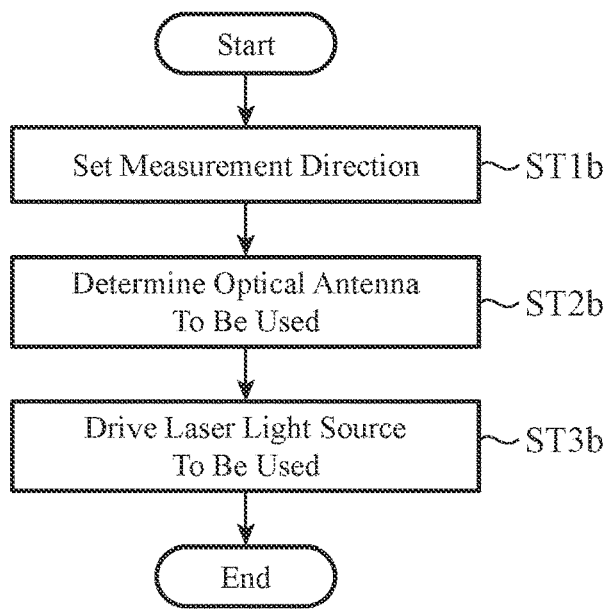
FIG. 8 is a flowchart illustrating operation of a direction switching unit according to the first embodiment.

FIG. 8 is a flowchart illustrating operations of the direction switching unit 12b, and illustrates detailed processing of step ST2 in FIG. 6.

When the measurement direction is set by the setting unit 13 (step ST1b), the direction switching unit 12b determines the optical antenna that emits transmission light in the same direction as the measurement direction set by the setting unit 13 (step ST2b). As described above, the first optical antenna 9a, the second optical antenna 9b, and the third optical antenna 9c each emit transmission light in directions different from each other. The setting unit 13 selects a measurement direction from the three directions in which the optical antennas emit transmission light, and sets the selected measurement direction in the direction switching unit 12b. The selection of a measurement direction may be performed by a user by specifying the measurement direction in the setting unit 13 by using an input device.

The direction switching unit 12b selects and drives a laser light source associated with the optical antenna determined in step ST2b from among the first laser light source 2a, the second laser light source 2b, and the third laser light source 2c (step ST3b). For example, when the laser light source associated with the optical antenna determined in step ST2b is the third laser light source 2c among the first laser light source 2a, the second laser light source 2b, and the third laser light source 2c, the direction switching unit 12b selects this laser light source. The laser radar device 1 can switch the direction of transmission light emission by determining an optical antenna to be used on the basis of the orientations of transmission light emitted from the optical antennas and the measurement direction set by the setting unit 13, and driving the laser light source associated with the determined optical antenna.

Note that the emitting ends of the optical fibers in the first optical antenna 9a, the second optical antenna 9b, and the third optical antenna 9c are arranged at offset positions with which beams of transmission light focus at equal distance to each other even when the laser light source is sequentially switched to the first laser light source 2a, the second laser light source 2b, and the third laser light source 2c and the wavelength of oscillation light input to the optical antenna changes. As a result, even when the laser light source is switched and the optical path of oscillation light is thus switched, measurement can be performed under the same focus distance and the same light transmittances of the optical multiplexing unit 3 and the optical branching/multiplexing unit 8, which achieves, without using a mechanical scanning mechanism, measurement equivalent to that with a configuration to mechanically scan optical paths.

Furthermore, the optical systems included in the first optical antenna 9a, the second optical antenna 9b, and the third optical antenna 9c may each include a diffractive lens having chromatic dispersion characteristics. Emission of transmission light through the diffractive lens increases the variable width of the focus distance of transmission light with respect to a change in the wavelength.

Figure 9:
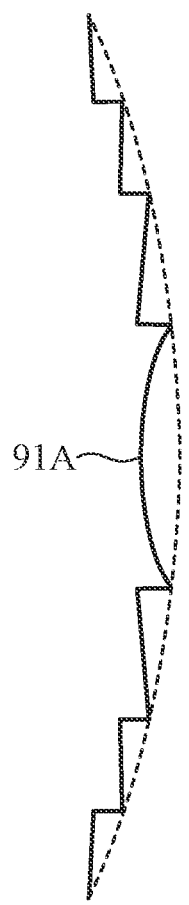
FIG. 9 is a conceptual diagram illustrating a cross section of a diffractive lens.

FIG. 9 is a conceptual diagram illustrating a cross section of a diffractive lens 91A. The diffractive lens 91A is used instead of the lens 91 included in the optical system of each of the optical antennas illustrated in FIGS. 3A, 3B, and 3C. A curve illustrated by a broken line in FIG. 9 represents the surface of the lens 91 illustrated for comparison with the surface of the diffractive lens 91A. The surface of the diffractive lens 91A has a shape with a plurality of steps as illustrated in FIG. 9 to diffract incident light. Stepped surfaces of the steps closer to the outer circumference are narrower like a Fresnel lens. The diffractive lens 91A is designed so that the stepped surfaces are integral multiples of the wavelength of incident light, which produces a lens effect.

Because the diffractive lens 91A produces a lens effect with a minute structure on the order of the wavelength of incident light, the optical system of an optical antenna can be made smaller. In addition, the diffractive lens 91A has high chromatic dispersion characteristics, and the focus distance of light outgoing therefrom changes depending on the wavelength of light incident thereon.

Because the chromatic dispersion characteristics of the focus distance are increased as a result of replacement of the lens 91 by the diffractive lens 91A, the variable range of the focus distance of outgoing light with respect to a change in the wavelength of incident light is larger with the diffractive lens 91A than with the lens 91.

Note that the shape of the diffractive lens 91A is not limited to that illustrated in FIG. 9.

An independent diffractive lens may be used or a plurality of diffractive lenses may be used as long as the variable distance of the focus distance of outgoing light with respect to the wavelength of incident light can be increased.

While the configuration of the laser radar device 1 including three pairs of laser light source and optical antenna has been presented above, the number of the pairs may be four or more, or may be two. For example, at least three pairs of laser light source and optical antenna are needed for measurement of three-dimensional wind speed, but one-dimensional or two-dimensional wind speed can be measured with one pair or two pairs thereof. In this case as well, no driving mechanisms for mechanically moving the lenses are needed in the optical antennas, and the increase in weights and sizes of the optical antennas is prevented or reduced.

In addition, the first laser light source 2a, the second laser light source 2b, and the third laser light source 2c and the TEC of the focus distance controlling unit 12a may be integrated in a laser module.

As described above, the laser radar device 1 according to the first embodiment performs control to make the focus distance of transmission light equal to the measurement distance by switching among a plurality of laser light sources that emit beams of oscillation light having wavelengths different from each other to switch the direction of transmission light emission while maintaining the focus position of the optical antennas, and changing the wavelength of oscillation light depending on the measurement distance. This enables the laser radar device 1 to dynamically control the focus distance of oscillation light without using a driving mechanism for mechanically adjusting the position of a lens included in an optical antenna. Note that, because no driving mechanisms for mechanically moving lenses are needed, the increase in weight and size of the optical antenna device 9 is prevented or reduced.

The laser radar device 1 according to the first embodiment includes the setting unit 13 that receives a measurement distance, and sets the received measurement distance in the controlling unit 12. The controlling unit 12 performs control to make the focus distance of transmission light equal to the measurement distance set by the setting unit 13. This configuration enables a user to set a measurement distance in the controlling unit 12 by using the setting unit 13.

In the laser radar device 1 according to the first embodiment, each of the first laser light source 2a, the second laser light source 2b, and the third laser light source 2c outputs oscillation light having a wavelength depending on temperature. The controlling unit 12 adjusts the temperatures of the first laser light source 2a, the second laser light source 2b, and the third laser light source 2c to change the wavelengths of the oscillation light. For example, the controlling unit adjusts the first laser light source 2a, the second laser light source 2b, and the third laser light source 2c together to the same temperature to output oscillation light having wavelengths according to the adjusted temperature from the first laser light source 2a, the second laser light source 2b, and the third laser light source 2c. This enables the laser radar device 1 to adjust the focus distances of three transmission lights at the same time.

In the laser radar device 1 according to the first embodiment, the first optical antenna 9a, the second optical antenna 9b, and the third optical antenna 9c each include a diffractive lens 91A. Oscillation light output from each of the first laser light source 2a, the second laser light source 2b, and the third laser light source 2c is emitted through the diffractive lens 91A. This configuration increases the variable width of the focus distance of transmission light output from the optical antenna device 9.

Second Embodiment

Figure 10:
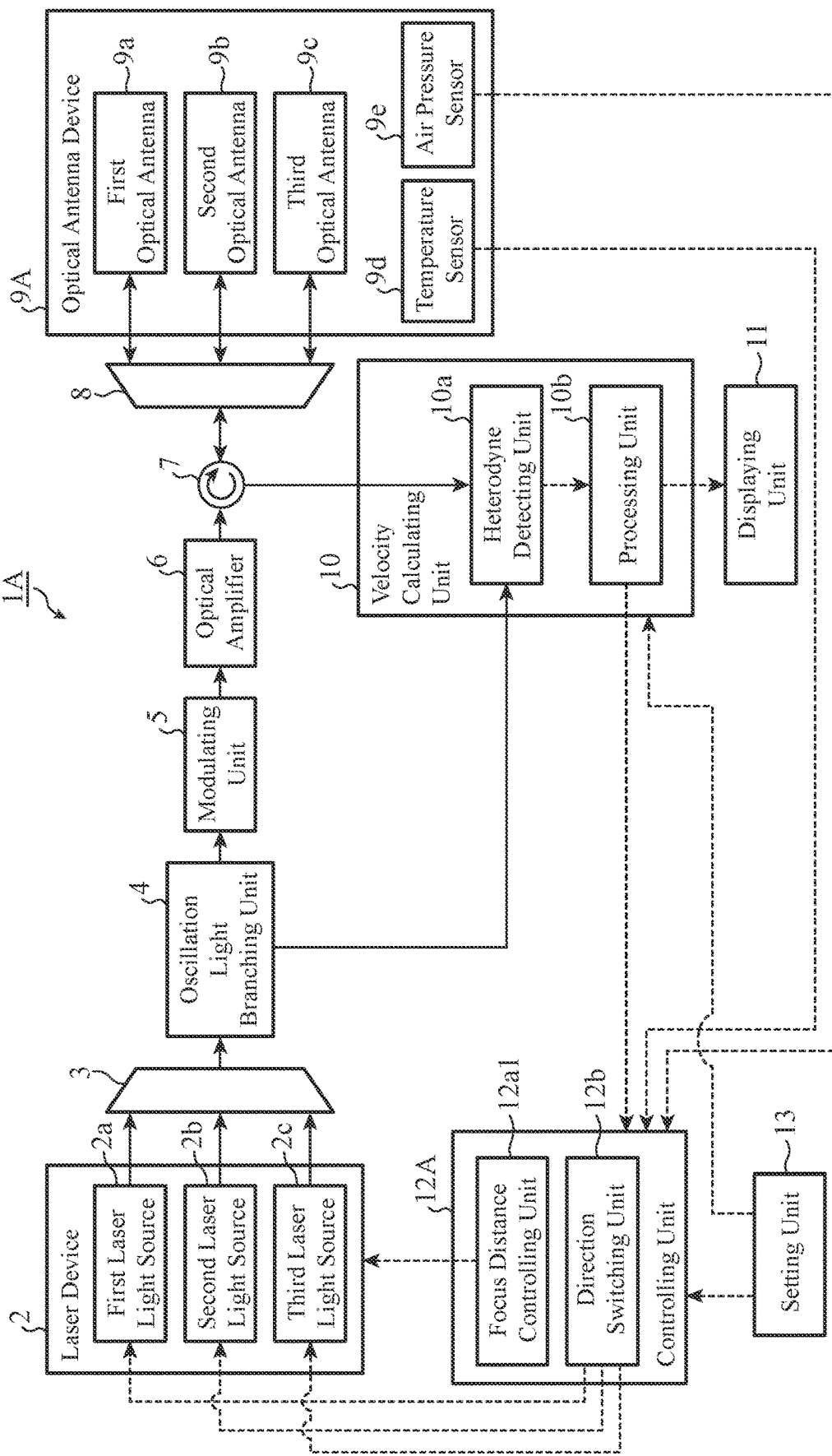
FIG. 10 is a block diagram illustrating a configuration of a laser radar device according to a second embodiment of this disclosure.

FIG. 10 is a block diagram illustrating a configuration of a laser radar device 1A according to a second embodiment of this disclosure, in which the laser radar device 1A functions as a wind vane and anemometer. In FIG. 10, solid arrows represent transmission paths of optical signals, which are optical fibers, for example. Dashed arrows represent transmission paths of electrical signals. In addition, components that are the same as those in FIG. 1 are designated by the same reference numerals, and the description thereof will not be repeated. The laser radar device 1A performs control to make a focus distance of oscillation light, which is output from a laser device 2, equal to a measurement distance, which corresponds to the position at which the wind speed is to be measured, by changing the wavelength of the oscillation light according to the measurement distance.

The laser radar device 1A includes the laser device 2, an optical multiplexing unit 3, an oscillation light branching unit 4, a modulating unit 5, an optical amplifier 6, a circulator 7, an optical antenna device 9A, a velocity calculating unit 10, a displaying unit 11, a controlling unit 12A, and a setting unit 13. The laser device 2 includes a first laser light source 2a, a second laser light source 2b, and a third laser light source 2c. The optical antenna device 9A includes a first optical antenna 9a, a second optical antenna 9b, a third optical antenna 9c, a temperature sensor 9d, and an air pressure sensor 9e. The velocity calculating unit 10 includes a heterodyne detecting unit 10a and a processing unit 10b, and the controlling unit 12A includes a focus distance controlling unit 12a1 and a direction switching unit 12b.

The optical antenna device 9A collects and emits transmission light, and receives received light that is the transmission light reflected by an object present at a position to which the transmission light is emitted. The first optical antenna 9a, the second optical antenna 9b, and the third optical antenna 9c each include a collimator lens having chromatic dispersion characteristics. The refractive index of glass constituting the collimator lens and the refractive index of the atmosphere depend on temperature, and the lens shape deforms by linear expansion.

The focal length of the collimator lens changes depending on the temperature of each of the first optical antenna 9a, the second optical antenna 9b, and the third optical antenna 9c. In addition, as the refractive index of the atmosphere changes with a change in atmospheric pressure, the focal length of the collimator lens also changes with the atmospheric pressure. The laser radar device 1A can perform control to adjust the focus distance of transmission light to a target measurement position by measuring the temperature and the air pressure of the optical antenna device 9A, and controlling the wavelength of the transmission light on the basis of the refractive index of the collimator lens according to the measured temperature and air pressure.

The temperature sensor 9d measures the temperatures inside the first optical antenna 9a, the second optical antenna 9b, and the third optical antenna 9c. For example, the temperature sensor 9d measures the temperatures of the collimator lenses provided inside the optical antennas. The air pressure sensor 9e measures the air pressures inside the first optical antenna 9a, the second optical antenna 9b, and the third optical antenna 9c. For example, the air pressure sensor 9e measures air pressure in the space through which oscillation light emitted from the emitting end of the optical fiber propagates inside the optical antenna before being emitted through the collimator lens.

Note that electrical signals of measured values obtained by the temperature sensor 9d and the air pressure sensor 9e are output to the controlling unit 12A.

The controlling unit 12A controls the wavelengths of transmission light on the basis of the refractive indices of the collimator lenses according to the temperatures and the air pressures inside the first optical antenna 9a, the second optical antenna 9b, and the third optical antenna 9c measured by the temperature sensor 9d and the air pressure sensor 9e, respectively.

The focus distance controlling unit 12a1 controls the wavelengths of transmission light according to the temperatures and the air pressures inside the first optical antenna 9a, the second optical antenna 9b, and the third optical antenna 9c.

In the focus distance controlling unit 12a1, the changes in the optical path differences of transmission light associated with the changes in the refractive indices of the collimator lenses depending on the temperatures and the air pressures in the optical antennas and the changes in the wavelengths of oscillation light depending on the temperatures of the laser light sources are set in advance.

For example, for a change in the optical path difference of transmission light associated with a change in the refractive index of the collimator lens depending on the temperature and the air pressure in an optical antenna, a change in the optical path difference of transmission light with respect to the measured values from the temperature sensor 9d and the air pressure sensor 9e is measured or calculated in advance. The obtained measured value or calculated value is set in the focus distance controlling unit 12a1.

In addition, for a change in the optical path difference of transmission light associated with a change in the wavelength of oscillation light depending on the temperature of the laser light sources, a change in the optical path difference of transmission light with respect to the temperature of the first laser light source 2a, the second laser light source 2b, and the third laser light source 2c is measured or calculated in advance. The obtained measured value or calculated value is set in the focus distance controlling unit 12a1.

Data representing the changes in the optical path differences of transmission light depending on the temperatures and the air pressures in the optical antennas and the temperatures of the laser light sources can be expressed by numerical formulas or a table. Hereinafter, assume that these data are set in a form of table data in the focus distance controlling unit 12a1.

When a measurement distance is set by the setting unit 13 and measured values are input from the temperature sensor 9d and the air pressure sensor 9e, the focus distance controlling unit 12a1 refers to the table data and identifies the temperatures of the laser light sources associated with the wavelengths of transmission lights with which the focus distance of the transmission light becomes equal to the measurement distance. The focus distance controlling unit 12a1 performs control to make the focus distance of transmission light equal to the measurement distance by controlling the temperatures of the laser light sources to the identified temperature to change the wavelengths of oscillation light output from the laser device 2.

Next, operations will be explained.

FIG. 11 is a flowchart illustrating operation of the laser radar device 1A.

Because processes from step ST2c to step ST3c in FIG. 11 are the same as those in step ST2 to step ST3 in FIG. 6, the description thereof will not be repeated. The temperature sensor 9d measures the temperatures inside the first optical antenna 9a, the second optical antenna 9b, and the third optical antenna 9c. The air pressure sensor 9e measures the air pressures inside the first optical antenna 9a, the second optical antenna 9b, and the third optical antenna 9c. The temperature sensor 9d and the air pressure sensor 9e output electrical signals of the measured values to the controlling unit 12A through transmission paths of electrical signals.

The focus distance controlling unit 12a1 performs control to make the focus distance equal to the measurement distance by changing the wavelengths of the oscillation light according to the temperatures and the air pressures in the optical antennas and the measurement distance set by the setting unit 13 (step ST1c).

For example, the focus distance controlling unit 12a1 refers to the table data and obtains optical path differences of transmission light to be emitted from the optical antennas on the basis of measurement information on the temperatures measured by the temperature sensor 9d and measurement information on the air pressures measured by the air pressure sensor 9e. The focus distance controlling unit 12a1 then refers to the table data and identifies the temperature of the laser light sources associated with the wavelength of transmission light with which the focus distance becomes equal to the measurement distance set by the setting unit 13 on the basis of the set measurement distance and in view of the obtained optical path differences of transmission light. Subsequently, the focus distance controlling unit 12a1 performs temperature control on the laser light sources with a target at the identified temperature by using the TEC. As a result, the wavelength of oscillation light output from the laser device 2 changes according to the measurement distance.

While a case in which the optical antenna device 9A includes both the temperature sensor 9d and the air pressure sensor 9e has been described, the optical antenna device 9A may include either one of the temperature sensor 9d and the air pressure sensor 9e. For example, in the focus distance controlling unit 12a1, table data indicating changes in optical path differences of transmission light depending on the temperatures or the air pressures in the optical antennas and changes in the wavelengths of transmission light depending on the temperatures of the laser light sources are set. The focus distance controlling unit 12a1 refers to the table data to obtain an optical path difference of transmission light on the basis of a measurement distance set by the setting unit 13. Thereafter, the focus distance controlling unit 12a1 identifies the temperature of the laser light sources with which the focus distance becomes equal to the measurement distance in view of the obtained optical path difference of transmission light, and controls the temperatures of the laser light sources to the identified temperature.

The temperature sensor 9d and the air pressure sensor 9e may further measure the temperature and the air pressure of the atmosphere of the entire optical antenna device 9A. When the temperature and the air pressure of the atmosphere of the entire optical antenna device 9A are measured, the focus distance controlling unit 12a1 controls the temperatures of the first laser light source 2a, the second laser light source 2b, and the third laser light source 2c together. When the temperature and the air pressure in each of the first optical antenna 9a, the second optical antenna 9b, and the third optical antenna 9c are measured, the focus distance controlling unit 12a1 controls the temperature of each laser light source associated with each one of the optical antennas.

As described above, the laser radar device 1A according to the second embodiment includes the temperature sensor 9d that measures the temperatures in the optical antennas. The controlling unit 12A performs control to make the focus distance equal to the measurement distance on the basis of the temperatures measured by the temperature sensor 9d.

The laser radar device 1A also includes the air pressure sensor 9e that measures the air pressures in the optical antennas. The controlling unit 12A performs control to make the focus distance equal to the measurement distance on the basis of the air pressures measured by the air pressure sensor 9e. The controlling unit 12A changes the wavelength of transmission light so that, even when the refractive index of a collimator lens included in an optical antenna is changed by the temperature and the air pressure in the optical antenna, the influence of a change in the focus distance depending on the temperature and the air pressure in the optical antenna is reduced. This enables the laser radar device 1A to perform control to adjust the focus distance of transmission light to a target measurement position.

The focus distance controlling unit in the first and second embodiments performs control to make the focus distance of transmission light emitted from an optical antenna equal to a measurement distance set by the setting unit 13 by changing the wavelength of oscillation light output from a laser light source depending on the set measurement distance.

In this case, the measurement distance set by the setting unit 13 need not be exactly equal to the distance to a position at which measurement is to be performed. The transmission light may be focused near a position at which measurement is to be performed as long as the accuracy (the S/N ratio of a measurement result, for example) of measurement of an object at the position of measurement is within a permissible range.

While the focus distance controlling unit in the first and second embodiments changes the wavelength of oscillation light to be output from the laser light source by changing the temperature of the laser light source, no limitation is intended thereto. For example, the wavelength of oscillation light output from a laser light source may be changed by physical application of pressure on an element of the laser light source.

Third Embodiment

The functions of the velocity calculating unit 10 and the controlling unit 12 of the laser radar device 1 are implemented by processing circuitry. Specifically, the laser radar device 1 includes a processing circuit for performing the processes from step ST1 to step ST3 illustrated in FIG. 6. In a similar manner, the functions of the velocity calculating unit 10 and the controlling unit 12A of the laser radar device 1A are implemented by a processing circuit for performing the processes from step ST1c to step ST4c illustrated in FIG. 11. These processing circuits may be dedicated hardware, or may be a central processing unit (CPU) for executing programs stored in a memory.

Figure 12A:
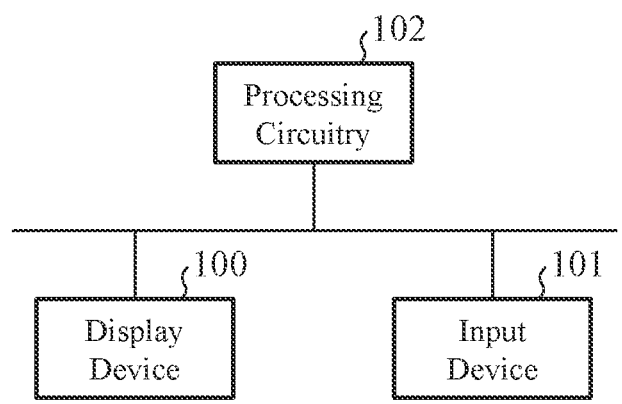
FIG. 12A is a block diagram illustrating a hardware configuration for implementing the functions of components that perform signal processing in the laser radar device according to the first or second embodiment.
Figure 12B:
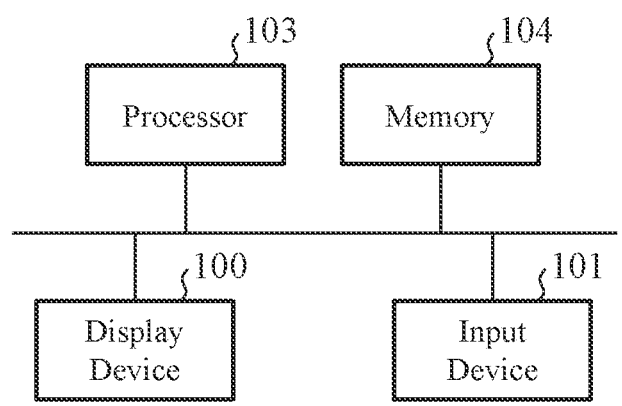
FIG. 12B is a block diagram illustrating hardware configuration for executing software for implementing the functions of the components that perform signal processing in the laser radar device according to the first or second embodiment.

FIG. 12A is a block diagram illustrating a hardware configuration for implementing the functions of the components that perform signal processing in the laser radar device 1 or the laser radar device 1A. FIG. 12B is a block diagram illustrating a hardware configuration for executing software for implementing the functions of the components that perform signal processing in the laser radar device 1 or the laser radar device 1A. In FIGS. 12A and 12B, the components that perform signal processing are the velocity calculating unit 10 and the controlling unit 12 in the laser radar device 1, and the velocity calculating unit 10 and the controlling unit 12A in the laser radar device 1A.

A display device 100 corresponds to the displaying unit 11 illustrated in FIGS. 1 and 10, and displays a result of analysis of a wind direction and wind speed distribution made by the velocity calculating unit 10. An input device 101 is a device for receiving inputs made by a user, and is implemented by a touch panel, hardware keys and a mouse, or the like. The setting unit 13 receives input of information using the input device 101, identifies a measurement distance and a measurement direction on the basis of the received information, and sets the identified measurement distance and measurement direction in the controlling unit 12.

In a case where the processing circuitry is processing circuitry 102 that is dedicated hardware illustrated in FIG. 12A, the processing circuitry 102 may be a single circuit, a composite circuit, a programmed processor, a parallel-programmed processor, an application specific integrated circuit (ASIC), a field-programmable gate array (FPGA), or a combination thereof, for example.

The functions of the velocity calculating unit 10 and the controlling unit 12 of the laser radar device 1 may be implemented by separate processing circuits, or may be integrated into one processing circuit.

In addition, the functions of the velocity calculating unit 10 and the controlling unit 12A of the laser radar device 1A may be implemented by separate processing circuits, or may be integrated into one processing circuit.

In a case where the processing circuitry is a processor 103 illustrated in FIG. 12B, the functions of the velocity calculating unit 10 and the controlling unit 12 of the laser radar device 1 are implemented by software, firmware, or a combination of software and firmware.

The functions of the velocity calculating unit 10 and the controlling unit 12A of the laser radar device 1A are also implemented by software, firmware, or a combination of software and firmware. Note that the software or firmware is described in the form of programs and stored in a memory 104.

The processor 103 implements the functions of the velocity calculating unit 10 and the controlling unit 12 of the laser radar device 1 by reading and executing the programs stored in the memory 104.

Thus, the laser radar device 1 includes the memory 104 for storing programs, which, when executed by the processor 103, results in execution of the processes from step ST1 to step ST3 illustrated in FIG. 6.

In a similar manner, the laser radar device 1A includes the memory 104 for storing programs, which, when executed by the processor 103, results in execution of the processes from step ST1c to step ST4c illustrated in FIG. 11. These programs cause a computer to execute the procedures or methods of the velocity calculating unit 10 and the controlling unit 12. The memory 104 may be a computer-readable storage medium storing programs for causing a computer to function as the velocity calculating unit 10 and the controlling unit 12. This is also applicable to the laser radar device 1A.

The memory 104 may be a nonvolatile or volatile semiconductor memory such as a random access memory (RAM), a read only memory (ROM), a flash memory, an erasable programmable read only memory (EPROM), or an electrically-EPROM (EEPROM), a magnetic disk, a flexible disk, an optical disc, a compact disc, a mini disc, or a DVD, for example.

Some of the functions of the velocity calculating unit 10 and the controlling unit 12 may be implemented by dedicated hardware, and others may be implemented by software or firmware.

For example, the functions of the velocity calculating unit 10 may be implemented by a processing circuit, which is dedicated hardware, and the functions of the controlling unit 12 may be implemented by the processor 103 reading and executing programs stored in the memory 104. This is also applicable to the velocity calculating unit 10 and the controlling unit 12A of the laser radar device 1A.

As described above, the processing circuitry is capable of implementing the functions by hardware, software, firmware, or a combination thereof.

Note that the present invention is not limited to the embodiments described above, and the embodiments can be freely combined, any components in the embodiments can be modified, or any components in the components can be omitted within the scope of the invention.

INDUSTRIAL APPLICABILITY

A laser radar device according to the present invention is capable of dynamically controlling the focus distance of oscillation light without using a driving mechanism for mechanically adjusting the position of a lens included in an optical antenna, and can thus be used for a wind vane and anemometer mounted on a movable body, for example.

REFERENCE SIGNS LIST 1, 1A: laser radar device, 2: laser device, 2a: first laser light source, 2b: second laser light source, 2c: third laser light source, 3: optical multiplexing unit, 4: oscillation light branching unit, 5: modulating unit, 6: optical amplifier, 7: circulator, 8: optical branching/multiplexing unit, 9, 9A: optical antenna device, 9a: first optical antenna, 9b: second optical antenna, 9c: third optical antenna, 9d: temperature sensor, 9e: air pressure sensor, 10: velocity calculating unit, 10a: heterodyne detecting unit, 10b: processing unit, 11: displaying unit, 12, 12A: controlling unit, 12a, 12a1: focus distance controlling unit, 12b: direction switching unit, 13: setting unit, 90: emitting end, 91: lens, 91A: diffractive lens, 92: lens, 93: lens, 100: display device, 101: input device, 102: processing circuitry, 103: processor, 104: memory

The invention claimed is:

1. A laser radar device comprising:
a plurality of laser light sources for outputting beams of oscillation light having wavelengths different from each other at a same temperature;
a modulator for modulating frequencies and intensities of the beams of oscillation light output from the laser light sources;
a plurality of optical antennas, each including an optical component, for emitting the beams of oscillation light in directions different from each other, modulated by the modulator via the optical component as beams of transmission light that focus at a position distanced by a focus distance, and receiving beams of reflected light as beams of received light, the beams of reflected light being the beams of transmission light that are reflected by an object present at a position to which the beams of transmission light are emitted; and
processing circuitry
to calculate a velocity of the object on a basis of the beams of oscillation light output from the laser light sources and the beams of received light received by the optical antennas; and
to control the laser light sources, wherein
a deviation of a focus position depending on a difference in wavelength of light input to each optical component of the optical antennas is subjected to offset correction in advance,
a beam of oscillation light emitted from a laser light source is emitted from an optical antenna associated with the laser light source among the optical antennas, and
the processing circuitry is configured to perform control to make the focus distance equal to a measurement distance by switching the laser light sources to switch emission directions of the beams of transmission light while maintaining the focus position of the optical antenna, and changing a wavelength of the oscillation light outputted by the plurality of laser light sources according to the measurement distance.

2. The laser radar device according to claim 1, wherein the processing circuitry is configured to receive a setting of the measurement distance, and set the measurement distance, and
the processing circuitry is configured to perform control to make the focus distance equal to the measurement distance having been set.

3. The laser radar device according to claim 1, wherein the laser light sources are configured to output beams of oscillation light with wavelengths according to temperature, and
the processing circuitry is configured to change the wavelengths of the beams of oscillation light by adjusting the temperatures of the laser light sources.

4. The laser radar device according to claim 3, wherein the processing circuitry is configured to adjust the temperatures of the laser light sources together to a same temperature.

5. The laser radar device according to claim 1, wherein the optical antennas include a diffractive lens, and
a beam of oscillation light output from the laser light sources is configured to be emitted through the diffractive lens.

6. The laser radar device according to claim 1, further comprising:
a temperature sensor for measuring a temperature in the optical antennas, wherein
the processing circuitry is configured to perform control to make the focus distance equal to the measurement distance on a basis of the temperature measured by the temperature sensor.

7. The laser radar device according to claim 6, further comprising:
an air pressure sensor for measuring an air pressure in the optical antennas, wherein
the processing circuitry is configured to perform control to make the focus distance equal to the measurement distance on a basis of the air pressure measured by the air pressure sensor.

8. The laser radar device according to claim 1, further comprising:
an air pressure sensor for measuring an air pressure in the optical antennas, wherein
the processing circuitry is configured to perform control to make the focus distance equal to the measurement distance on a basis of the air pressure measured by the air pressure sensor.

* * * * *